United States Patent
Chang et al.

(10) Patent No.: US 10,528,693 B2
(45) Date of Patent: Jan. 7, 2020

(54) LAYOUT OPTIMIZATION OF A MAIN PATTERN AND A CUT PATTERN

(71) Applicant: Taiwan Semiconductor Manufacturing Company, Ltd., Hsin-Chu (TW)

(72) Inventors: Shih-Ming Chang, Zhubei (TW); Kuei-Liang Lu, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 117 days.

(21) Appl. No.: 15/357,716

(22) Filed: Nov. 21, 2016

(65) Prior Publication Data
US 2017/0124243 A1    May 4, 2017

Related U.S. Application Data

(62) Division of application No. 14/059,328, filed on Oct. 21, 2013, now Pat. No. 9,501,601.

(60) Provisional application No. 61/792,179, filed on Mar. 15, 2013, provisional application No. 61/785,302, filed on Mar. 14, 2013.

(51) Int. Cl.
| | |
|---|---|
| *G06F 17/50* | (2006.01) |
| *H01L 23/52* | (2006.01) |
| *H01L 21/027* | (2006.01) |
| *H01L 27/02* | (2006.01) |
| *H01L 23/528* | (2006.01) |
| *G03F 1/00* | (2012.01) |

(52) U.S. Cl.
CPC ...... *G06F 17/5072* (2013.01); *G06F 17/5068* (2013.01); *G06F 17/5081* (2013.01); *H01L 21/027* (2013.01); *H01L 23/528* (2013.01); *H01L 27/0207* (2013.01); *G03F 1/144* (2013.01); *G06F 2217/06* (2013.01); *H01L 2924/0002* (2013.01)

(58) Field of Classification Search
CPC ............ G06F 17/5072; G06F 17/5081; G06F 17/5068; G06F 2217/06; H01L 27/0207; H01L 21/027; H01L 23/528; H01L 2924/0002; G03F 1/144; G03F 1/70
USPC ............................. 716/50, 54, 55, 119, 122
See application file for complete search history.

(56) References Cited

U.S. PATENT DOCUMENTS

| | | | | |
|---|---|---|---|---|
| 5,262,739 A | * | 11/1993 | Dalman | H01P 5/10 333/26 |
| 7,291,923 B1 | * | 11/2007 | Lesea | H01L 23/5222 257/644 |
| 7,388,451 B2 | * | 6/2008 | Brunone | H01L 23/66 333/34 |
| 7,422,018 B2 | | 9/2008 | Dieudonat | |
| 7,759,801 B1 | * | 7/2010 | Lesea | H01L 23/5222 257/644 |
| 8,365,108 B2 | * | 1/2013 | Baum | G03F 1/70 378/35 |

(Continued)

*Primary Examiner* — Stacy Whitmore
(74) *Attorney, Agent, or Firm* — Haynes and Boone, LLP

(57) ABSTRACT

An integrated circuit device includes first and second features, each including an end portion arranged along a common axis, and separated by a space. The end portion of the first feature includes a first indention adjacent to the space. The end portion of the second feature includes a first indention adjacent to the space, mirroring the first indention of the first feature about the space. The end portions are substantially similar in shape.

20 Claims, 11 Drawing Sheets

(56) References Cited

U.S. PATENT DOCUMENTS

| | | | |
|---|---|---|---|
| 8,423,945 B2 | 4/2013 | Bickford | |
| 8,656,322 B1* | 2/2014 | Dechene | G03F 7/0002 716/55 |
| 2002/0075093 A1* | 6/2002 | Mauritz | H01P 5/028 333/34 |
| 2002/0151200 A1* | 10/2002 | Fauser | H01T 4/08 439/181 |
| 2004/0248045 A1 | 12/2004 | Tanaka | |
| 2005/0076316 A1 | 4/2005 | Pierrat | |
| 2005/0133922 A1* | 6/2005 | Fjelstad | H01L 23/13 257/758 |
| 2006/0177744 A1 | 8/2006 | Bodendorf | |
| 2006/0190850 A1 | 8/2006 | Kohie | |
| 2007/0174802 A1* | 7/2007 | Shin | G03F 1/36 716/124 |
| 2008/0238774 A1* | 10/2008 | Ratni | H01Q 3/2617 342/372 |
| 2009/0119634 A1* | 5/2009 | Sweis | G03F 1/36 716/50 |
| 2009/0289257 A1* | 11/2009 | Sakurai | G03F 1/36 257/59 |
| 2009/0315048 A1* | 12/2009 | Fehrer | H01L 33/20 257/98 |
| 2010/0050149 A1* | 2/2010 | Cote | G03F 1/26 716/55 |
| 2010/0320558 A1* | 12/2010 | Chang | G06F 17/5068 257/499 |
| 2011/0198674 A1* | 8/2011 | Krauss | G01N 27/4141 257/253 |
| 2012/0094219 A1* | 4/2012 | Fujimura | G06F 17/5077 430/5 |
| 2012/0102440 A1* | 4/2012 | Sweis | G03F 1/36 716/53 |
| 2012/0317524 A1 | 12/2012 | Toaka | |
| 2014/0215417 A1 | 7/2014 | Landis | |
| 2017/0075228 A1* | 3/2017 | Ugajin | G06F 17/5068 |
| 2017/0139318 A1* | 5/2017 | Wallace | G03F 1/36 |

\* cited by examiner

LAYOUT OPTIMIZATION OF A MAIN PATTERN AND A CUT PATTERN

PRIORITY INFORMATION

This patent is a divisional of U.S. patent application Ser. No. 14/059,328 filed Oct. 21, 2013 and entitled "Layout Optimization of a Main Pattern and a Cut Pattern," which claims the benefit of U.S. Ser. No. 61/792,179 filed Mar. 15, 2013 and U.S. Ser. No. 61/785,302 filed Mar. 14, 2013, the disclosures of which are hereby incorporated by reference.

BACKGROUND

Integrated circuits may be formed using various photolithographic techniques. Such techniques involve exposing a photoresist layer to a light source through a patterned photo-mask. As the patterns formed into photoresist layers become increasingly dense, it becomes difficult to use a single photo-mask to form a pattern in the photoresist layer because features within the nanometer range are smaller than the resolution of a light source to which the photo-resist layer is exposed. Thus, multiple masks may be used to form the features within a pattern.

In some cases, a target pattern is formed through use of both a main pattern and a cut pattern. The cut pattern removes features formed by the main pattern in order to achieve the desired target pattern. Cut patterns can be used to split main patterns into smaller features to create the desired patterns. Using such techniques provides certain advantages to the photolithographic process. For example, it is desirable to have a large process window. The process window refers to the range of focus and exposure settings that will still produce the desired features into the photoresist layer. A process window can be improved by having features within a pattern adhere to a uniform density. This may involve placement of "dummy" features. Dummy features are extra features that are placed within the main pattern in order to maintain feature density, but do not serve any function within the circuit for which the pattern is designed. Cut features can also be used to separate dummy features from real functional features.

Placement of the cut features within the cut feature mask is an important consideration. If two cut features are too close to each other, then it can be difficult to form the cut features properly. Moreover, the cut features may adversely affect adjacent features. Thus, it is beneficial to consider the placement of cut features when designing a layout for a target pattern.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90degrees or at other orientations) and the spatially relative descriptors used herein may likewise be interpreted accordingly.

Figure 1:
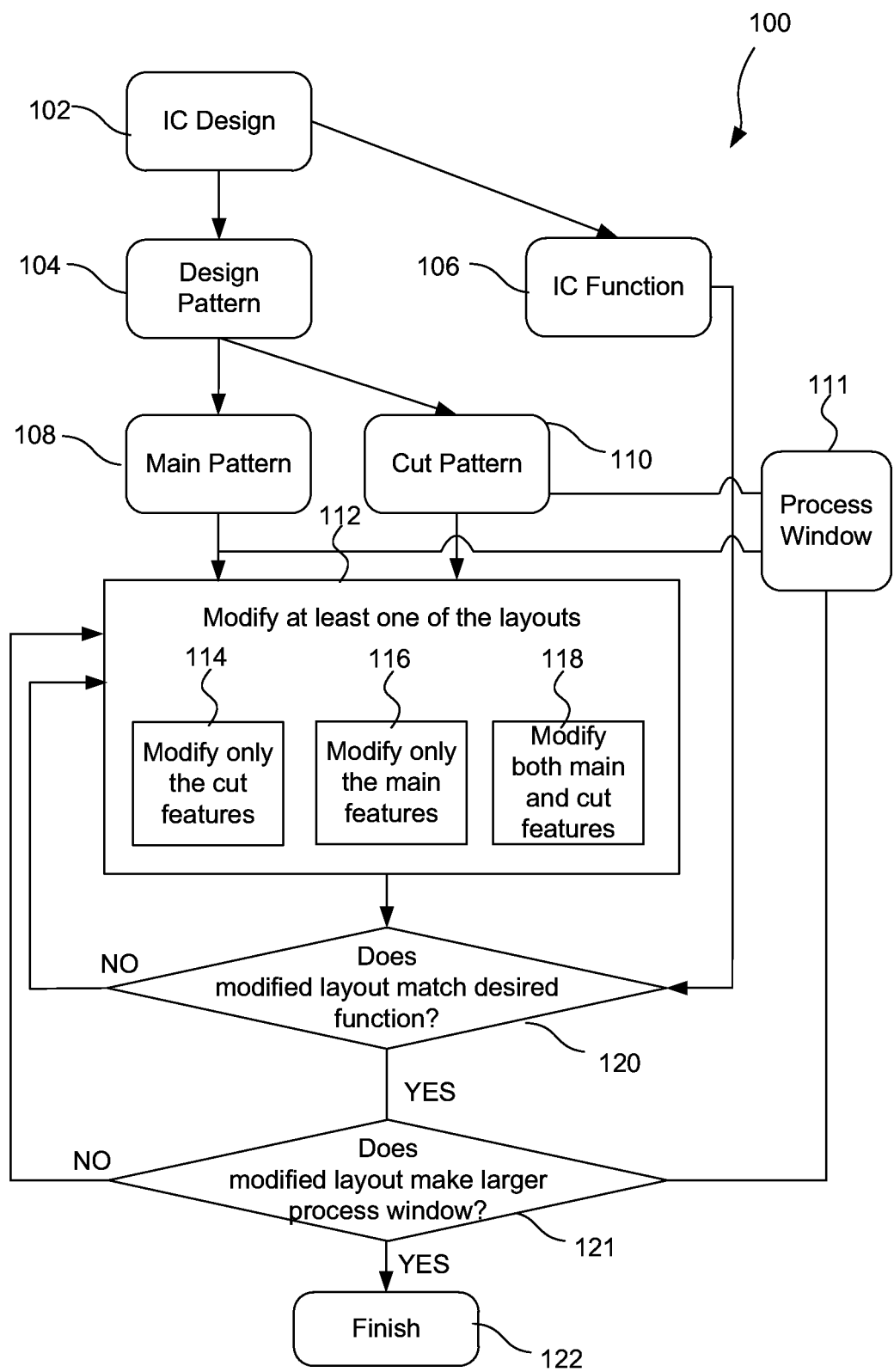
FIG. 1 is a flowchart showing an illustrative process for optimizing a main pattern and cut pattern, according to one example of principles described herein.

FIG. 1 is a flowchart showing an illustrative process 100 for optimizing a main pattern and cut pattern. According to certain illustrative examples, a design pattern 104 is formed from an integrated circuit design 102. The integrated circuit design 102 may be in schematic form or in a layout form. The integrated circuit design 102 is intended to perform a certain function 106 within specified parameters. The design pattern 104 is an actual layout of the circuitry that will perform the desired function 106 within the specified parameters. The design pattern 104 may include additional layout features, such as those directed to optical proximity correction (OPC) or design for manufacturability (DFM). In addition or in the alternative, these additional layout features may be added at a later time, such as after the conclusion of the process 100.

It may not, however, be efficient to manufacture the design pattern 104 as defined. As mentioned above, a target pattern such as the design pattern 104 may be formed using a main pattern 108 and a cut pattern 110. The main pattern 108 may include features that are larger than in the design pattern 104. The cut pattern 110 is used to cut main features into smaller features. The main pattern 108 may also include additional features so that the pattern has a more uniform critical dimension. To make the final pattern function as desired, however, certain of these extra dummy features must be cut from the important features. Thus, the cut pattern 110 is used to cut the main features.

The checking 111 of the process window is applied to both the main pattern 108 and the cut pattern 110. The checking 111 of the process window may use an optical simulation or wafer exposure data. The result can be used to compare modified layouts.

The main pattern 108 is extracted according to a set of process guidelines. The process guidelines include a number of constraints on the layout that are designed to increase the process window. These guidelines may include keeping a substantially uniform critical dimension throughout the pattern. As mentioned above, maintaining a uniform critical dimension (CD) may involve the addition of dummy features. For example, dummy features are added to tune pattern density for improved CD uniformity.

In some cases, the positioning or sizing of features within the cut pattern 110 or main pattern 108 can be modified 112 to make formation of the final pattern more process-friendly. The criteria for what is considered process-friendly can depend on the type of process. For example, a photolithography process prefers that all features are of a uniform size and single orientation. An etching process prefers a uniform pattern density rather than a uniform pattern size. In one example, only the cut features of the cut pattern are modified 114. In one example, only the main features of the main pattern are modified 116. In a further example, both the main features and the cut features are modified 118.

A set of layout rules may be used to determine whether a main feature or a cut feature should be modified. Various layout rules may include limiting the difference in size between cut features. Another layout rule may set a minimum distance at which cut features may be placed from each other. A layout rule for main features may be the width of a main feature in relation to a cut feature used to cut that main feature. More detail on the types of modifications that can be made will be described in further detail below.

In order to ensure that the modifications of the main pattern and cut pattern do not adversely affect the function of the circuit associated with the design pattern 104, the function of the modified layout is compared 120 with the function 106 of the design pattern to determine if they match. This may be done, for example, through simulation programs that analyze the output of a circuit under various input conditions. If the function of the modified layout does not perform within specified parameters, then further modifications may be made until the modified layout performs as desired. If, however, the function of the modified layout matches the desired function 106, then the modification process continues to the process window comparison 121.

In order to ensure that the process windows of modified patterns 112 are larger than the process windows of original patterns 108 and 110, the comparison 121 is applied. If the process windows of the modified layout are not better than the process windows of the original patterns, then further modifications may be made until the process windows of the modified layouts perform as desired. If, however, the process window of the modified layout is larger than the original ones and they match as desired, then the modification is finished 122.

In the present embodiment, thus generated main pattern and cut pattern are used to form tape-out data for mask making. For example, the tape-out data are in GDS format.

In furtherance of the embodiment, two photomasks are manufactured according to the main pattern and cut pattern, respectively. The formation of the photomasks may use a suitable technology, such as electron-beam writing. Particularly, the main pattern is formed on a first photomask and the cut pattern is formed on a second photomask. The first and second photomasks are collectively used in a lithography patterning process to form a patterned material layer on an integrated circuit substrate, such as a semiconductor wafer.

A photomask includes a photomask substrate and a pattern formed thereon (the main pattern for the first photomask and the cut pattern for the second photomask). In one embodiment, such as ultraviolet (UV) or deep ultraviolet (DUV) lithography technologies, the photomask substrate includes a transparent substrate, such as fused quartz. The corresponding pattern is formed on the photomask substrate and is defined in an opaque material layer, such as chromium (Cr).

In another embodiment, such as extreme ultraviolet (EUV) technology, the photomask is a reflective photomask. An exemplary reflective mask may include a substrate of a low thermal expansion material (LTEM). A reflective multilayer (ML) is deposited on the substrate, and an absorber layer is deposited over the reflective ML and is further patterned to define the IC pattern. It is understood that other configurations and inclusion or omission of various items may be possible. For example, a capping layer may be formed between the reflective ML and absorber layer. In another example, a protection layer may be formed on the absorber layer. In other embodiments, the photomask may be a phase shift mask (PSM), such as attenuating PSM or alternating PSM, for enhanced imaging resolution.

FIGS. 2A-2F are diagrams showing an illustrative process from a cross-sectional perspective of forming a target pattern using a main pattern and a cut pattern. According to certain illustrative examples, a material layer 204 is formed onto a substrate 202. In one embodiment, the substrate 202 includes silicon, such as a silicon wafer. Alternatively, the substrate 202 includes germanium, silicon germanium or other suitable semiconductor material, such as diamond, silicon carbide or gallium arsenic. The substrate 202 may further include additional features and/or material layers, such as various isolation features formed in the substrate. The substrate 202 may include various p-type doped regions and/or n-type doped regions configured and coupled to form various devices and functional features. The substrate 202 may include other features, such as shallow trench isolation (STI) features. The substrate 202 may also include a portion of an interconnect structure that includes metal lines in various metal layers, via features to provide vertical connection between the metal lines in the adjacent metal layers, and contact features to provide vertical connection between the metal lines in the first metal layer and various device features (such as gates, sources and drains) on the substrate.

The material layer 204 includes a suitable material to be patterned. In one embodiment, a material layer 204 includes a dielectric material formed on the substrate 202. The dielectric material layer 204 may include plurality of dielectric films. In the present embodiment, the dielectric material includes an interlayer dielectric (ILD) material formed on the substrate 202. The ILD material layer includes a dielectric material, such as silicon oxide, low k dielectric material, other suitable dielectric material or combination thereof. The dielectric material layer is to be patterned (by the main pattern and cut pattern generated by the method 100) to form various trenches for interconnect features, such as contacts, via features or metal lines.

A first photo-resist layer 206 is then formed on top of the material layer 204. The photo-resist layer 206 is coated on the material layer 204 by a suitable technique, such as spin-on coating. The photo-resist layer 206 is then patterned so as to form a feature 208. This feature 208 is part of the main pattern. In one example, the procedure to pattern the photo-resist layer 206 includes exposing the photo-resist layer 206 by using the first photomask having the main pattern defined thereon.

Figure 2A:
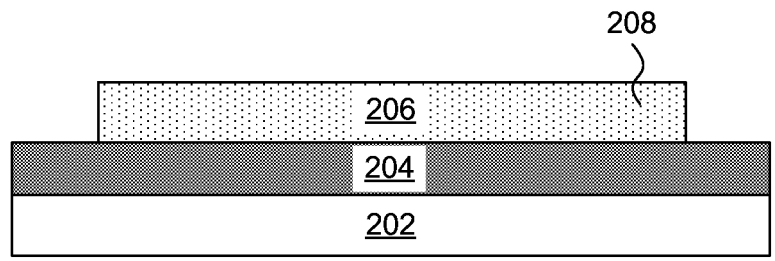
FIGS. 2A, 2B, 2C, 2D, 2E, and 2F are diagrams showing an illustrative process from a cross-sectional perspective of forming a target pattern using a main pattern and a cut pattern, according to one example of principles described herein.
Figure 2B:
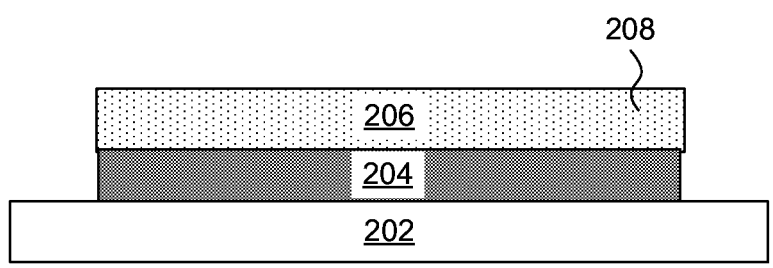

FIG. 2B illustrates an etching process that transfers the pattern formed into the first photo-resist layer 206 to the underlying material layer 204. The etching process uses a suitable etch technique, such as dry etch or wet etch with a suitable etchant to selectively etch the material layer 204 without etching the substrate 202. In the present embodiment, the first photo-resist layer 206 is removed afterward by a suitable method, such as wet stripping or plasma ashing.

Figure 2C:
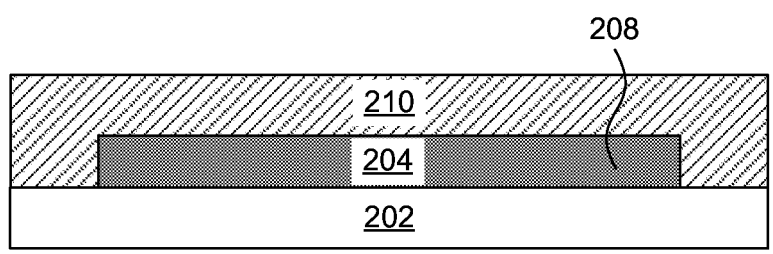

FIG. 2C illustrates the deposition of a second photo-resist layer 210 after the first photo-resist layer has been removed. The second photo-resist layer 210 is used to form the cut pattern. In one embodiment, the deposition of the second photo-resist layer 210 includes a spin-on coating process and may be followed by a baking process.

Figure 2D:
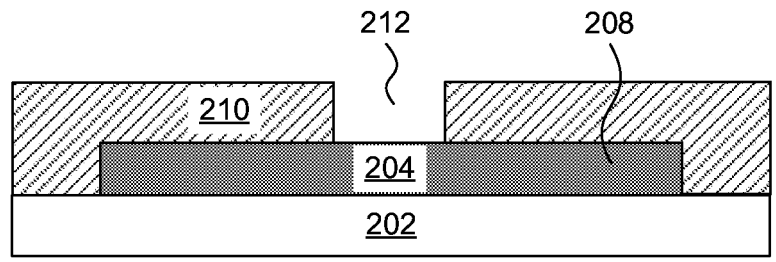

FIG. 2D illustrates the formation of a cut feature 212 into the second photo-resist layer 210 by a lithography patterning process using the second photomask having the cut pattern defined thereon. The lithography patterning process includes exposing the second photo-resist layer 210 using the second photomask, and thereafter, developing the second photo-resist layer 210 to form a patterned second photo-resist layer 210 having a cut feature 212. In the present example, the cut feature 212 is defined in an opening of the patterned second photo-resist layer 210. The lithography patterning process may further include other processing steps, such as post exposure baking (PEB) implemented between the exposing and the developing steps.

Figure 2E:
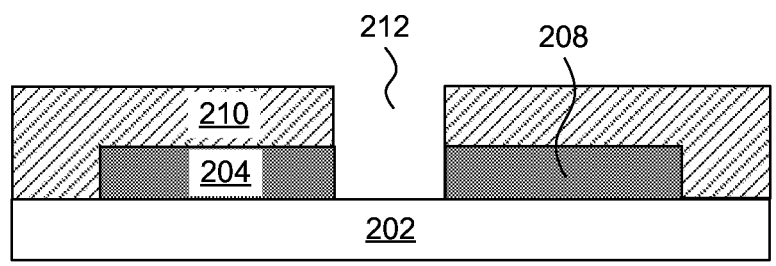
Figure 2F:
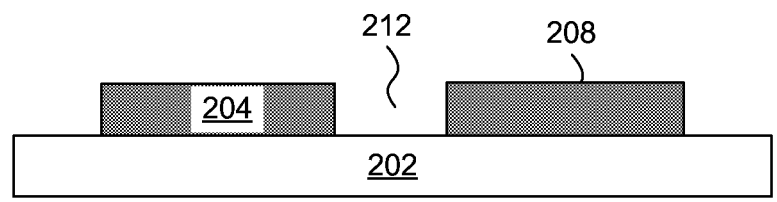

FIG. 2E illustrates an etching process that transfers the cut feature 212 to the underlying material layer 204. In one example, the etching process associated with the second photo-resist layer 210 is same as the etching process associated with the first photo-resist layer 206. FIG. 2F illustrates the removal of the second photo-resist layer by a suitable process, such as wet stripping or plasma ashing. As can be seen, the cut feature 212 "cuts" the main feature 208, resulting in a segmented main feature with two segments spaced from each other.

As one embodiment for illustration, the material layer 204 includes a conductive material layer, such as doped polycrystalline silicon (polysilicon) or metal. The segmented main feature defines two gate electrodes for field effect transistors. In furtherance of the embodiment, the material layer 204 includes a dielectric material layer for gate dielectric and the conductive material layer on the dielectric material layer.

The process illustrated in FIGS. 2A-2D is merely one method of using cut patterns. Other methods may be used in accordance with principles described herein. For example, some processes may involve the formation of cut features first, followed by the main features.

Figure 3A:
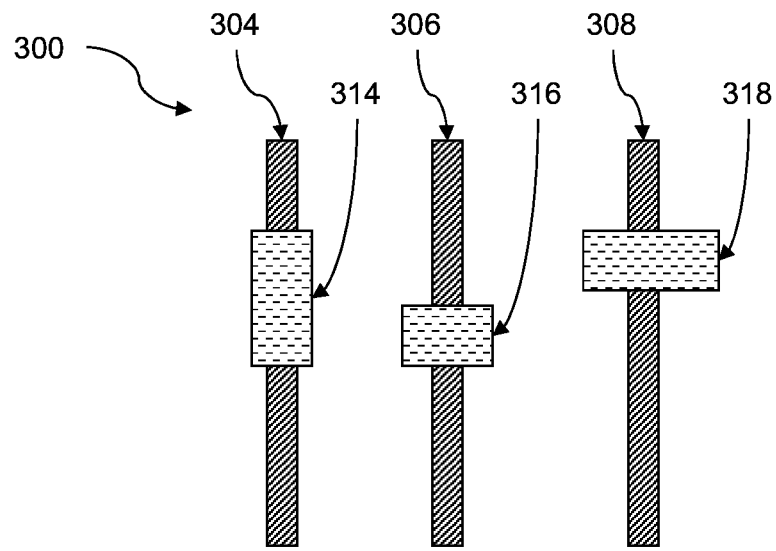
FIGS. 3A and 3B are diagrams showing illustrative top view of a set of cut becoming more process-friendly, according to one example of principles described herein.
Figure 3B:
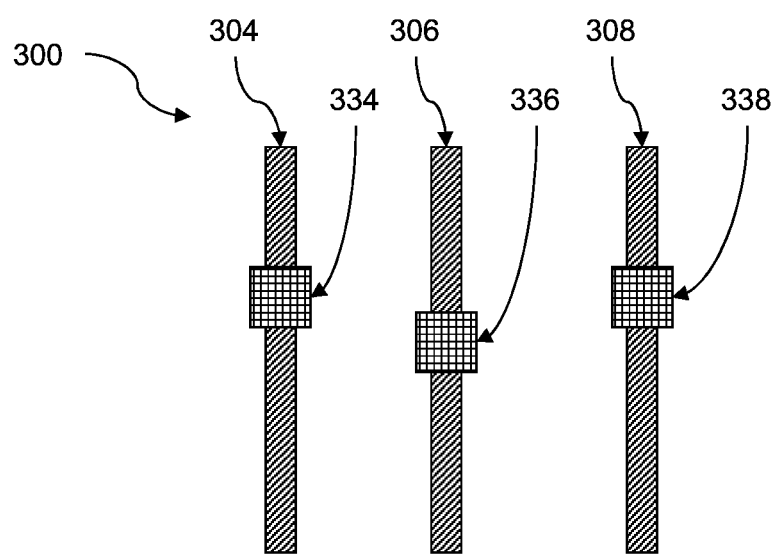

FIGS. 3A-3B are diagrams showing illustrative top view of two sets of cut feature separating main features. FIG. 3A illustrates an example of a pattern 300 including main features 304, 306 and 308; and cut features 314, 316, and 318. FIG. 3B contains the same pattern 300 but cut features 334, 336, and 338 have been modified to be of the same size and same orientation.

Considering the semiconductor process behavior, the cut pattern containing only one size and one orientation is more process-friendly in both lithographic process and etching process. Therefore, the cut features in FIG. 3B are better than the cut features in FIG. 3A.

Figure 4A:
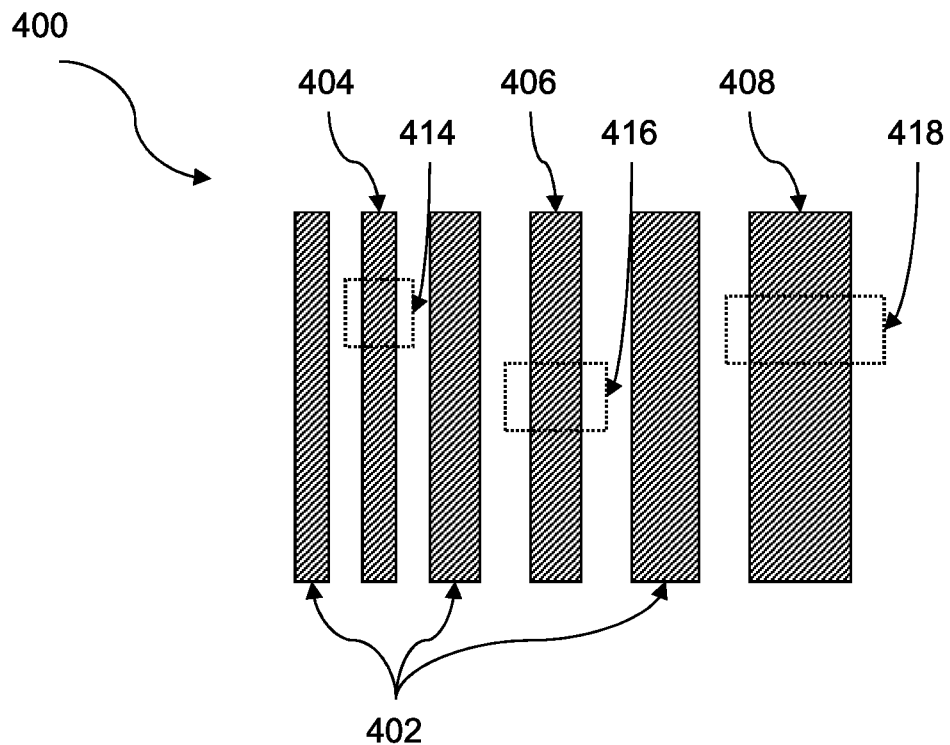
FIGS. 4A, 4B, 4C, 4D, and 4E are diagrams showing illustrative top view of a target pattern formed from a main pattern and a cut pattern, according to one example of principles described herein.

FIGS. 4A-4E are diagrams showing illustrative top view of a target pattern formed from a main pattern and a cut pattern. FIG. 4A illustrates an example of a pattern 400. This pattern 400 may include main features 402, 404, 406 and 408, and cut features 414, 416 and 418. The dotted squares 414, 416 and 418 indicate where cut features should be placed in order to cut the main features 404, 406 and 408. In some examples, a cut feature may be used to separate a main feature to smaller features. Specifically, two main features may be intended to end near each other but not be electrically connected.

Figure 4B:
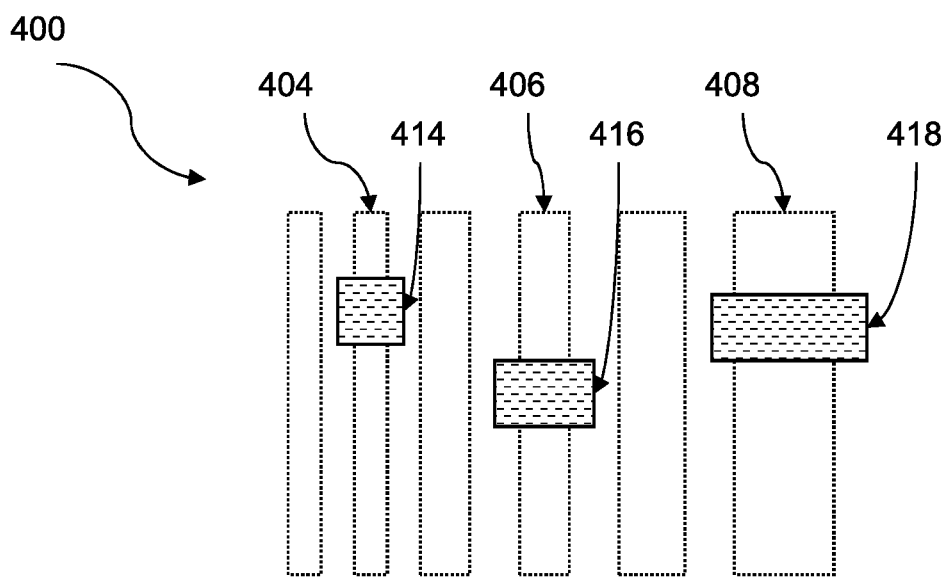

FIG. 4B illustrates the placement of cut features 414, 416 and 418 in relation to the main features 404, 406 and 408. As illustrated, the cut features are of different sizes. In some cases, the lithographic process that is used to form the cut features may be performed more efficiently if each of the cut features were the same size. Doing so may enlarge the process window.

Figure 4C:
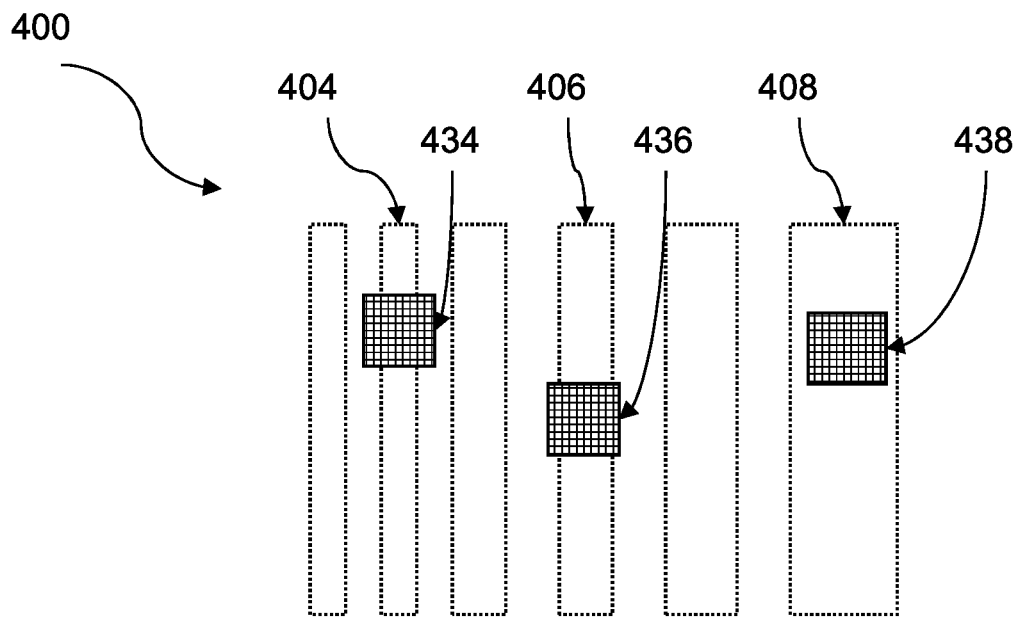

FIG. 4C is a diagram showing modified cut features. In this example, the cut features have been modified so that the cut features 434, 436, 438 are approximately the same size. The size to which each cut feature is modified may be based on the largest cut feature that will fit within a particular space without adversely affecting nearby main features. For example, the cut feature 434 between the narrower main features may have to be limited in size in order to avoid cutting nearby features.

This size limit, however, may create issues with other cut features. Particularly, the remaining cut features 436 and 438 are now too small to cut their respective main features 406 and 408. Thus, the main features need to be modified as well. Specifically, the main features 406 and 408 are narrowed around the location where the cut features 316 and 318 are to be placed. A layout rule for modifying the main features may be that a main feature should be at least a specific distance smaller in width than a cut feature that cuts that main feature.

Figure 4D:
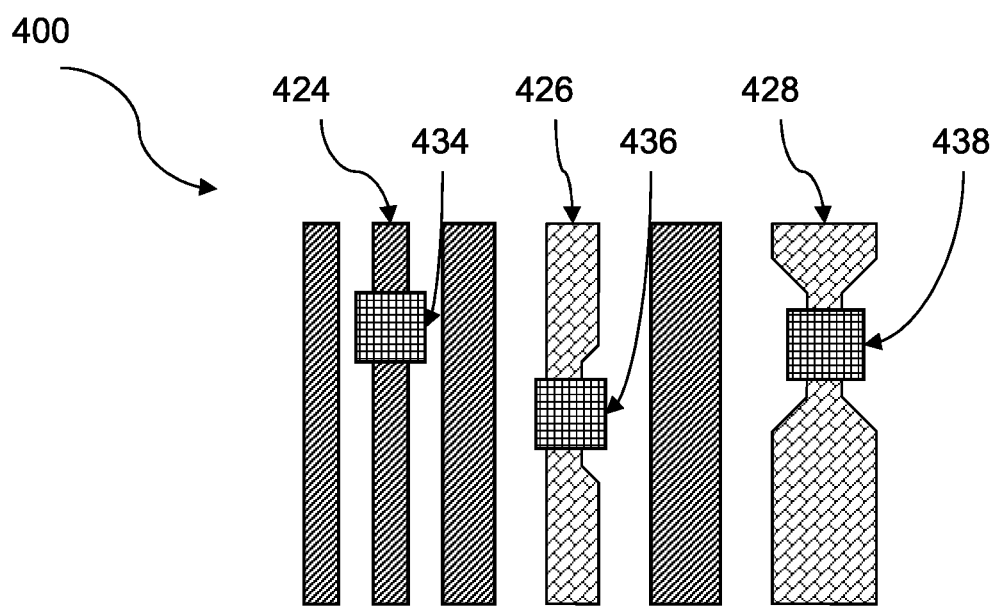

FIG. 4D is an example of modifying the main features to fit the cut features. The main features 406 and 408 may be narrowed in a variety of manners to accommodate the smaller cut features 436 and 438. For example, the main feature 406 cut by the cut feature 436 is narrowed on one side by placing an indent into the main feature 406 and then becomes new main feature 426. In one example, the main feature 408 cut by the cut feature 438 is narrowed on both sides by indents into the main feature 408 and then becomes new main feature 428.

Figure 4E:
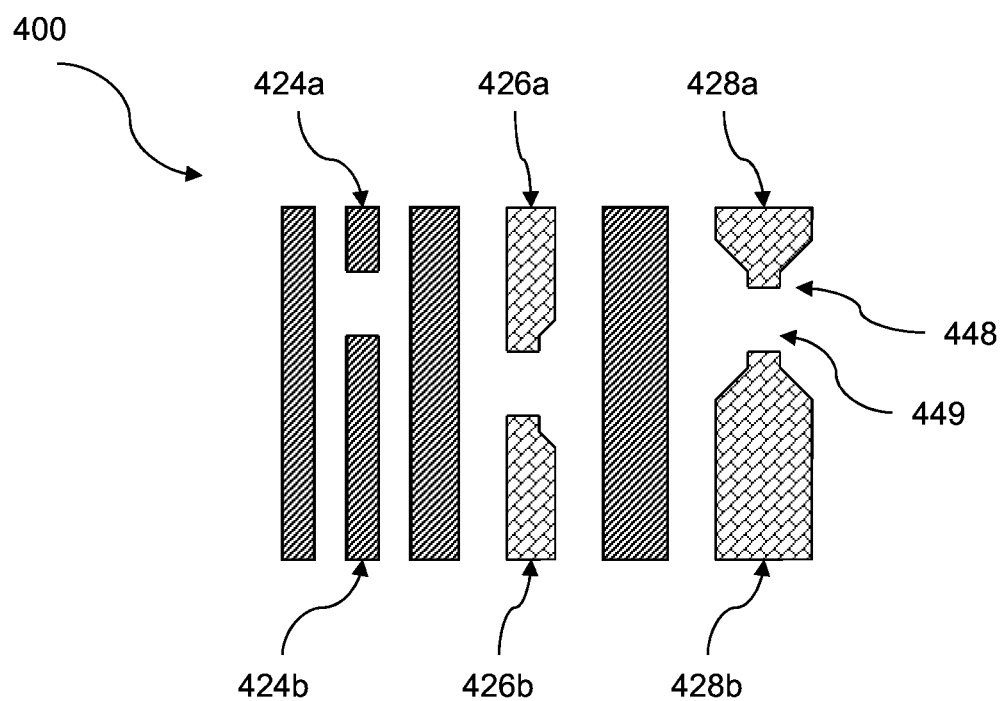

FIG. 4E is an example of a final pattern as it looks after the cut features remove portions of the main pattern. The main feature 424 becomes 424a and 424b. The main feature 426 becomes 426a and 426b. The main feature 428 becomes 428a and 428b. A final pattern formed onto a substrate using principles described herein bares some identifying characteristics. Specifically, the ends of a feature may include a narrowing 448 at the ends. This narrowing 448 may be on either one side or both sides of the feature end. Moreover, the edge 449 of the feature will have characteristics indicating it was formed through a cut pattern and not a standard pattern. This may also be determined by the alignment of two features that result from a single feature cut by a cut feature.

Thus, in this example, the main pattern and the cut pattern are both modified with respect to each other. In some cases, making each of the cut features the same size may not require that any modifications to the main pattern be made. Thus, in such cases, only the cut pattern is modified. In other cases, no modifications to the cut pattern may be useful. Thus, only the main pattern is modified.

Figure 5A:
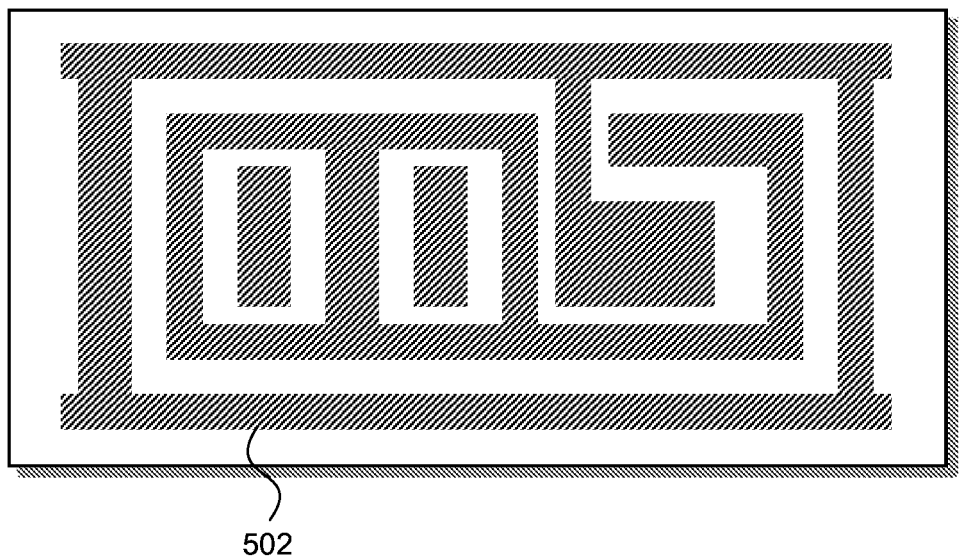
FIGS. 5A, 5B, 5C, and 5D are diagrams showing illustrative top view of a target pattern formed from a main pattern and a cut pattern, according to one example of principles described herein.

FIGS. 5A-5D are diagrams showing illustrative top view of a target pattern formed from a main pattern and a cut pattern. FIG. 5A is a diagram showing an illustrative unmodified main pattern 500. The main pattern includes a number of main features.

Figure 5B:
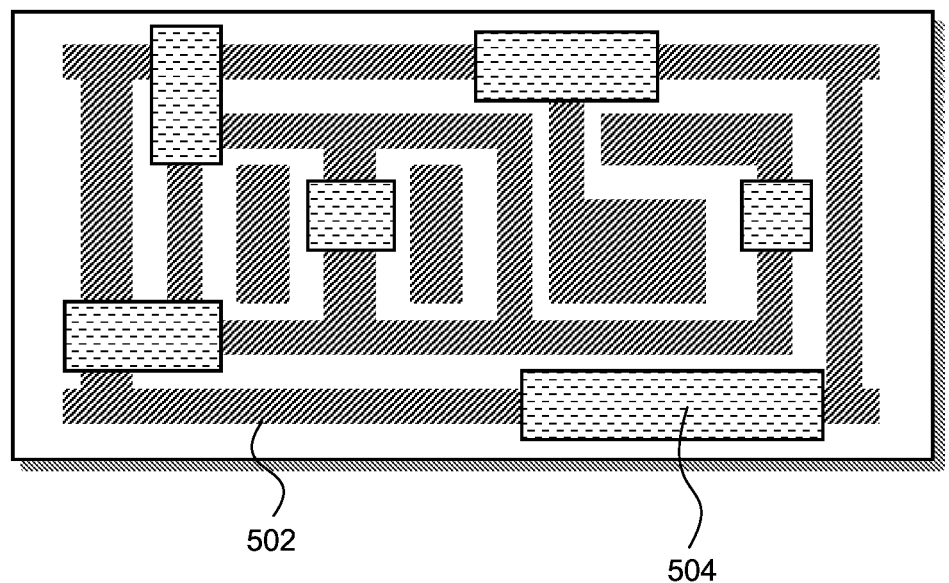

FIG. 5B illustrates an unmodified cut pattern 510 over the main pattern 500. The cut pattern includes a number of cut features 504. As mentioned above, the cut features are intended to remove unnecessary portions of the main features so that the circuit associated with the patterns will function properly. Each of the cut features 504, however, varies widely in size.

Figure 5C:
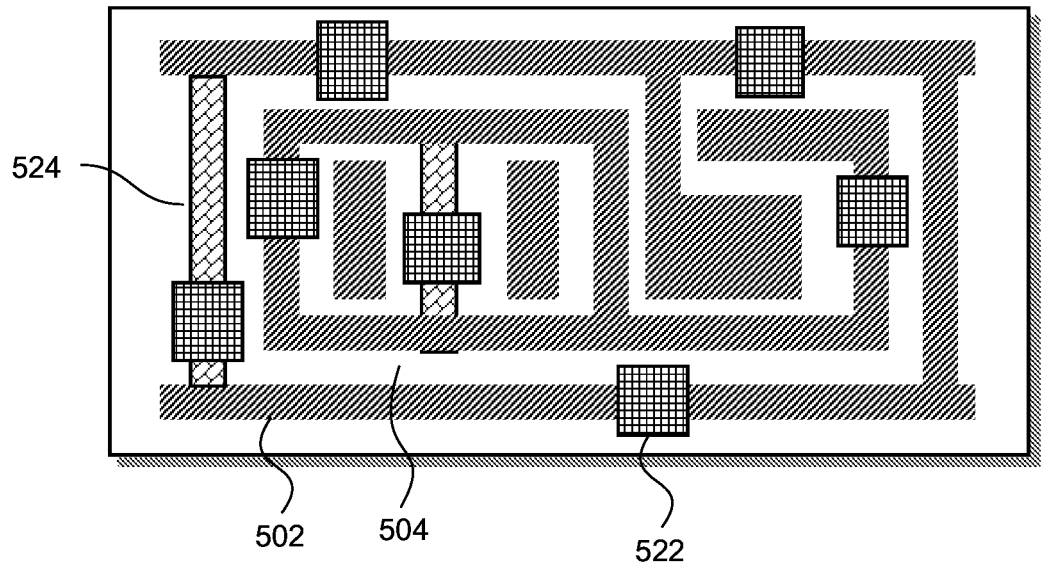

FIG. 5C is a diagram showing a modified cut pattern and a modified main pattern. In addition to being modified in size, the modified cut features 522 are relocated. This relocation may be due to a number of layout rules that make the formation of the cut features more efficient during the photolithographic process. Such rules may have constraints on how far away two cut features 522 may be from each other. For reasons mentioned above, some of the main features 524 may be modified as well in order to accommodate the changes made to the cut features.

Figure 5D:
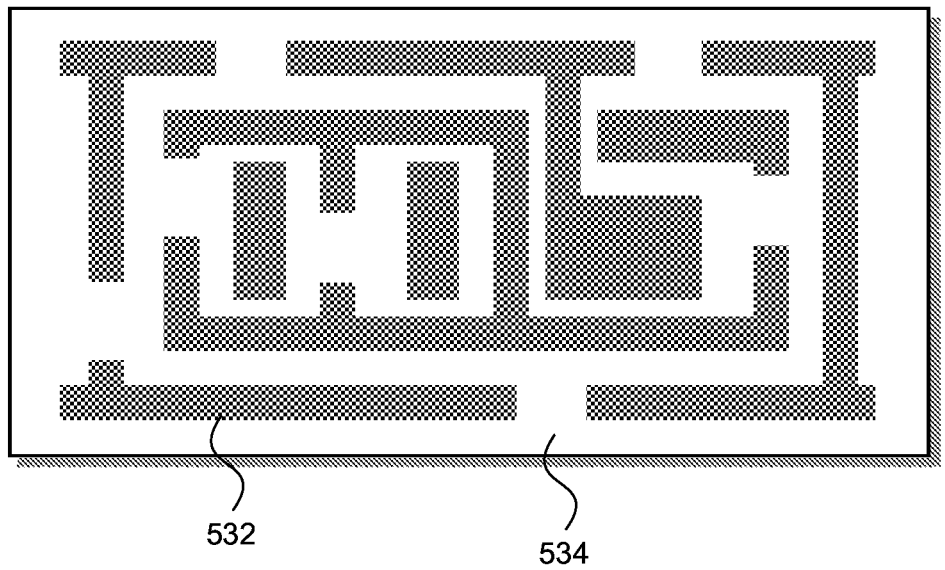

FIG. 5D represents the final pattern 530 resulting from the modified main pattern and the modified cut pattern. As mentioned above, this final pattern is to be analyzed to ensure that it functions as desires. Various simulation programs may be used to determine if the modified final pattern will function like the original pattern from which the main pattern and cut pattern were derived. In some examples, the main pattern and cut pattern may have to be modified if the function of the final pattern does not behave as it should within a particular tolerance.

Figure 6:
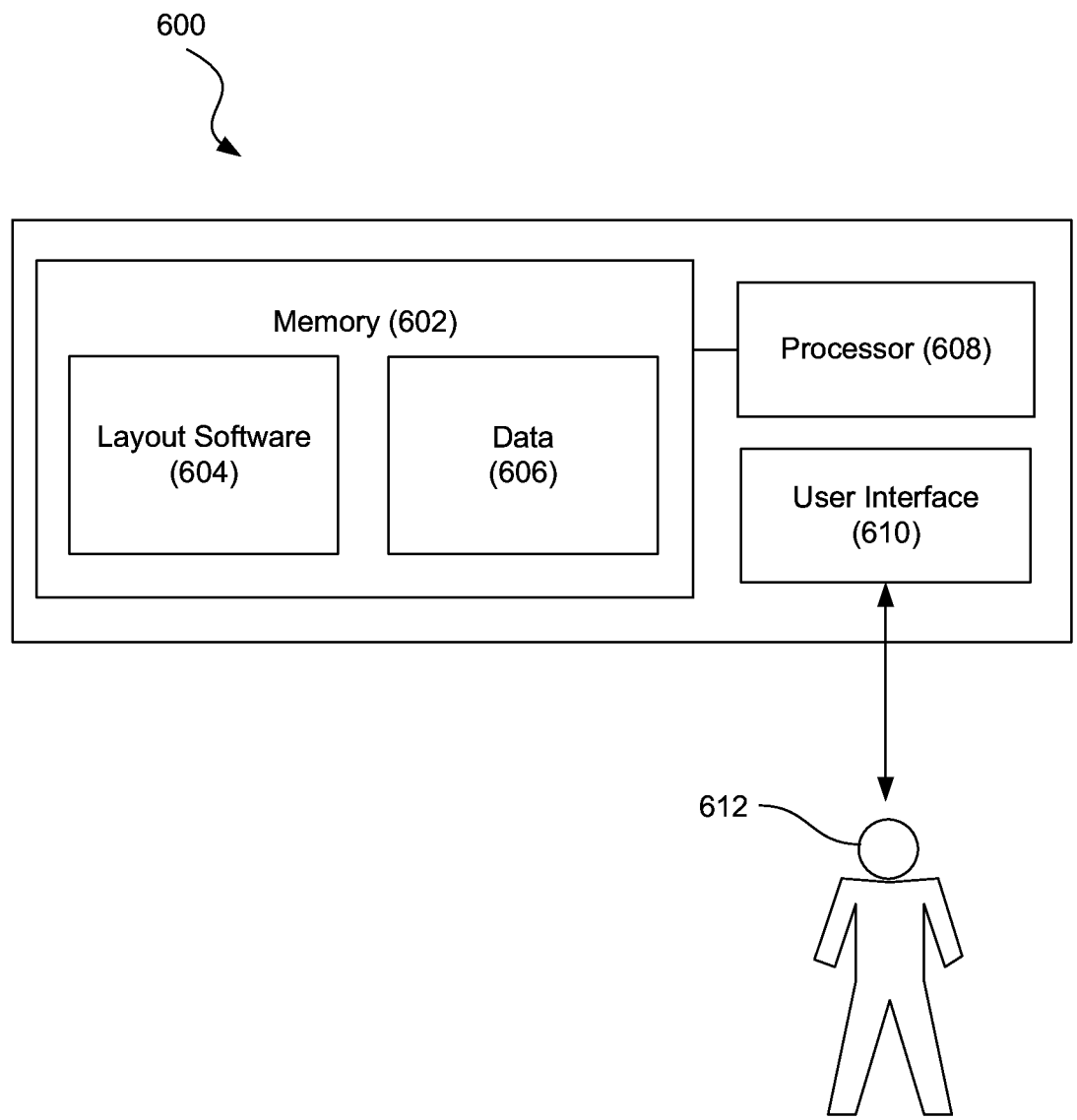
FIG. 6 is a diagram showing an illustrative computing system that may be used to optimize a main pattern and a cut pattern, according to one example of principles described herein.

FIG. 6 is a diagram showing an illustrative computing system that may be used to optimize a main pattern and a cut pattern. According to certain illustrative examples, the physical computing system 600 includes a memory 602 having modeling software 604 and data 606 stored thereon. The physical computing system 600 also includes a processor 608 and a user interface 610.

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software 604 and data 606.

The physical computing system 600 also includes a processor 608 for executing the software 604 and using or updating the data 606 stored in memory 602. In addition to storing the modeling software 604, the memory 602 may store an operating system. An operating system allows other applications to interact properly with the hardware of the physical computing system. The layout software 604 may include the tools to form final pattern layouts as well as main pattern layouts and cut pattern layouts. The layout software may be circuit design software such as Electronic Design Automation (EDA) software.

A user interface 610 may provide a means for a user 612 to interact with the system. The user may use various tools such as a keyboard or a mouse to input information into the physical computing system. Additionally, various output devices such as a monitor may be used to provide information to the user 612.

Figure 7:
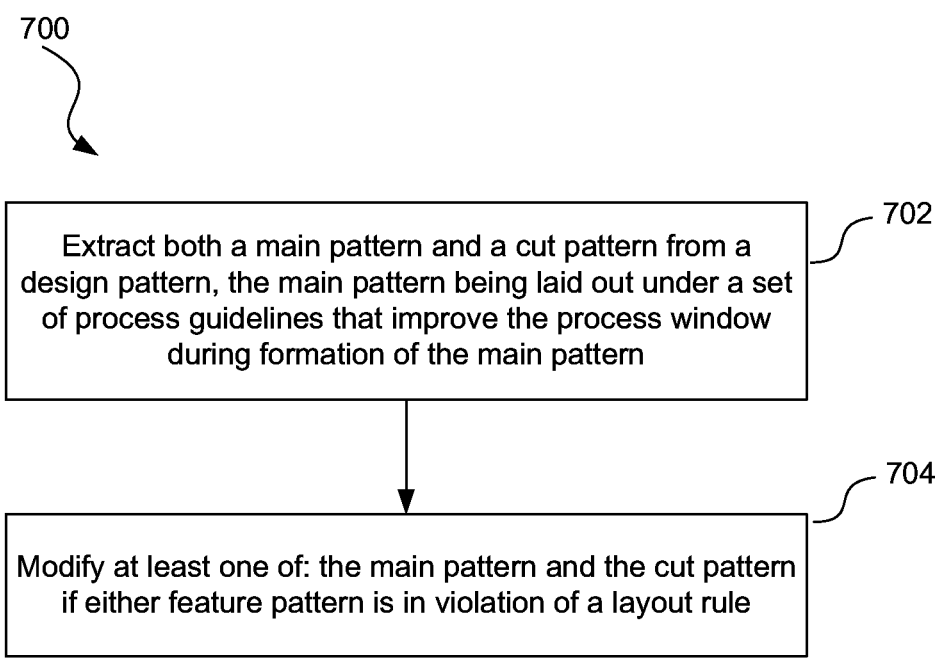
FIG. 7 is a flowchart showing an illustrative method for optimizing a main pattern and a cut pattern, according to one example of principles described herein.

FIG. 7 is a flowchart showing an illustrative method for optimizing a main pattern and a cut pattern. According to certain illustrative examples, the method includes a step for extracting 702 both a main pattern and a cut pattern from a design pattern, the main pattern being laid out under a set of process guidelines that improve the process window during formation of the main pattern. The method further includes a step for modifying 704 at least one of: the main pattern and the cut pattern if either feature pattern is in violation of a layout rule.

According to certain illustrative examples, a method for feature pattern modification includes extracting both a main pattern and a cut pattern from a design pattern, the main pattern being laid out under a set of process guidelines that improve the process window during formation of the main pattern. The method further includes modifying at least one of: the main pattern and the cut pattern if either feature pattern is in violation of a layout rule.

According to certain illustrative examples, a computing system includes a processor and a memory that includes computer readable instructions that when executed by the processor, cause the processor to extract both a main pattern and a cut pattern from a design pattern, the main pattern being laid out under a set of process guidelines that improve the process window during formation of the main pattern, and modify at least one of: the main pattern and the cut pattern if either feature pattern is in violation of a layout rule.

According to certain illustrative examples, an integrated circuit device includes a space between two features formed from a same main pattern. Ends of the features facing each other are formed with a cut feature. The ends of the features are narrower than portions of the feature farther from the ends.

It is understood that various different combinations of the above-listed embodiments and steps can be used in various sequences or in parallel, and there is no particular step that is critical or required. Additionally, although the term "electrode" is used herein, it will be recognized that the term includes the concept of an "electrode contact." Furthermore, features illustrated and discussed above with respect to some embodiments can be combined with features illustrated and discussed above with respect to other embodiments. Accordingly, all such modifications are intended to be included within the scope of this invention.

The foregoing has outlined features of several embodiments. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit device comprising:
   first and second features, each including an end portion arranged along a common axis, and separated by a space;
   wherein the end portion of the first feature includes a first indention adjacent to the space, the first indentation having within, a first edge parallel with the common axis and a second edge diagonal to the common axis, the second edge extending between a narrower portion and a wider portion of the first feature, the first edge being positioned between the second edge and an end of the first feature; and
   a third feature positioned parallel to both the first and second features, the third feature continually extending alongside the first feature, the space, and the second feature;
   wherein the end portion of the second feature includes a first indention adjacent to the space, mirroring the first indention of the first feature about the space; and
   wherein the end portions are substantially similar in shape.

2. The integrated circuit device of claim 1, wherein the first indentation of the first feature is on one side of the end portion, and another side of the end portion of the first feature does not include an indentation.

3. The integrated circuit device of claim 2, wherein the first indentation of the second feature is on one side of the end portion, and another side of the end portion of the second feature does not include an indentation, the other side of the end portion of the second feature mirroring the other side of the end portion of the first feature.

4. The integrated circuit device of claim 1, wherein the first indentation of the first feature is on one side of the end portion, and another side of the end portion of the first feature includes a second indentation.

5. The integrated circuit device of claim 4, wherein the first indentation of the second feature is on one side of the end portion, and another side of the end portion of the second feature includes a second indentation that mirrors the second indentation of the first feature.

6. The integrated circuit device of claim 1, wherein the first indentation of the second feature includes a first edge parallel with the common axis and a second edge diagonal to the common axis.

7. The integrated circuit device of claim 1, wherein the first indentation is a sole indentation on the first end portion.

8. The integrated circuit device of claim 1, wherein the second indentation is a sole indentation on the second end portion.

9. The integrated circuit device of claim 1, wherein the second edge has a greater length than the first edge.

10. An integrated circuit device comprising:
    a first elongated feature arranged along an axis, the first elongated feature comprising:
    a first end portion, the first end portion having a main portion, a tapered portion, and an indentation, wherein the main portion is wider than the indentation, and the tapered portion tapers between the main portion and the indentation, the tapered portion being positioned between two non-tapered portions;
    a second elongated feature arranged along the axis and separated from the first elongated feature by a space, the second elongated feature comprising:
    a second end portion; and
    a second indentation adjacent the second end portion and mirroring the first indentation;
    a third elongated feature positioned parallel to both the first and second elongated features, the third elongated feature continually extending alongside the first feature, the space, and the second feature.

11. The integrated circuit device of claim 8, wherein the first edge is closer to the first end portion than the second edge.

12. The integrated circuit device of claim 10, wherein the second indentation includes a first edge substantially parallel to the axis and a second edge substantially diagonal to the axis.

13. The integrated circuit device of claim 12, wherein the first edge is closer to the first end portion than the second edge.

14. The integrated circuit device of claim 10, wherein the second edge is longer than the first edge.

15. An integrated circuit device comprising:
    a first elongated feature arranged along an axis, the first elongated feature comprising:
    a first end portion; and
    a first set of indentations adjacent the first end portion;
    a second elongated feature arranged along the axis and separated from the first elongated feature by a space, the second elongated feature comprising:
    a second end portion; and
    a second set of indentations adjacent the second end portion and mirroring the first set of indentations; and
    a third elongated feature positioned parallel to both the first and second elongated features, the third elongated feature continually extending alongside the first feature, the space, and the second feature;
    wherein the first set of indentations further includes within, a substantially diagonal edges extending between a narrower non-tapered portion and a wider non-tapered portion of the first elongated feature.

16. The integrated circuit device of claim 15, wherein the first indentation further includes a second edge substantially diagonal to the axis and extending between the first edge and a side edge of the first elongated feature.

17. The integrated circuit device of claim 15, wherein the second indentation includes a first edge substantially parallel to the axis and adjacent the second end portion.

18. The integrated circuit device of claim 17, wherein the second indentation further includes a second edge substantially diagonal to the axis and extending between the first edge and a side edge of the second elongated feature.

19. The integrated circuit device of claim 15, wherein the space corresponds to a size of a cut feature.

20. The integrated circuit device of claim 15, wherein the diagonal edges are larger in length than edges of the non-tapered portion.

* * * * *